(12) United States Patent
Brewer et al.

(10) Patent No.: US 10,133,691 B2
(45) Date of Patent: Nov. 20, 2018

(54) SYNCHRONOUS INPUT/OUTPUT (I/O) CACHE LINE PADDING

(71) Applicant: INTERNATIONAL BUSINESS MACHINES CORPORATION, Armonk, NY (US)

(72) Inventors: Scott A. Brewer, Vail, AZ (US); David F. Craddock, New Paltz, NY (US); Matthew J. Kalos, Tucson, AZ (US); Matthias Klein, Wappingers Falls, NY (US); Eric N. Lais, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 126 days.

(21) Appl. No.: 15/190,262

(22) Filed: Jun. 23, 2016

(65) Prior Publication Data

US 2017/0371813 A1    Dec. 28, 2017

(51) Int. Cl.
*G06F 13/16* (2006.01)
*G06F 13/28* (2006.01)
(Continued)

(52) U.S. Cl.
CPC ...... *G06F 13/1689* (2013.01); *G06F 12/0815* (2013.01); *G06F 12/0868* (2013.01);
(Continued)

(58) Field of Classification Search
CPC ............. G06F 12/0866; G06F 12/0868; G06F 12/0871; G06F 12/0873; G06F 12/0877;
(Continued)

(56) References Cited

U.S. PATENT DOCUMENTS 5,586,297 A * 12/1996 Bryg .................. G06F 12/0835
710/110
5,590,378 A * 12/1996 Thayer ................... G06F 13/28
710/30

(Continued)

OTHER PUBLICATIONS

List of IBM Patents or Patent Applications Treated as Related, dated Jul. 13, 2016, 2 pages.

(Continued)

*Primary Examiner* — Thomas J Cleary
(74) *Attorney, Agent, or Firm* — Cantor Colburn LLP; Steven Chiu

(57) ABSTRACT

A computer-implemented method for synchronous input/output (I/O) cache line padding is described. The cache line padding occurs between a server having a processor executing an operating system and a recipient control unit. The method can include receiving, via the processor at the recipient control unit, a partial line direct memory access (DMA) write request; fetching, via the processor, a device table entry (DTE) associated with the partial line DMA write request; determining, via the processor, a cache line size for a synchronous input/output (I/O) cache line; and writing a full cache line DMA write request by padding, via the processor, the partial line DMA write request with a padded portion, where the padded portion is based on the cache line size.

20 Claims, 9 Drawing Sheets

(51) Int. Cl.
*G06F 12/08* (2016.01)
*G06F 12/0868* (2016.01)
*G06F 12/0815* (2016.01)
*G06F 12/0886* (2016.01)

(52) U.S. Cl.
CPC .......... *G06F 12/0886* (2013.01); *G06F 13/28* (2013.01); *G06F 2212/1024* (2013.01); *G06F 2212/281* (2013.01); *G06F 2213/28* (2013.01)

(58) Field of Classification Search
CPC ............. G06F 12/0886; G06F 12/0888; G06F 12/1081; G06F 12/12; G06F 12/126; G06F 13/28; G06F 15/17331; G06F 13/1689; G06F 12/0815
See application file for complete search history.

(56) References Cited

U.S. PATENT DOCUMENTS

| | | | |
|---|---|---|---|
| 6,085,278 A * | 7/2000 | Gates | G06F 13/32 710/22 |
| 6,629,213 B1 * | 9/2003 | Sharma | G06F 12/0866 711/144 |
| 7,181,578 B1 | 2/2007 | Guha et al. | |
| 7,234,101 B1 | 6/2007 | Konda et al. | |
| 8,225,004 B1 | 7/2012 | Rohde | |
| 8,589,603 B2 | 11/2013 | Craddock et al. | |
| 9,535,850 B1 * | 1/2017 | Gallatin | G06F 12/1081 |
| 2008/0043750 A1 * | 2/2008 | Keels | H04L 49/9094 370/395.52 |
| 2011/0010522 A1 * | 1/2011 | Abts | G06F 15/17375 712/3 |
| 2014/0208077 A1 * | 7/2014 | Bradbury | G06F 9/3001 712/222 |
| 2015/0085880 A1 | 3/2015 | An et al. | |
| 2015/0178211 A1 * | 6/2015 | Hiramoto | G06F 12/0806 711/143 |
| 2015/0234612 A1 * | 8/2015 | Himelstein | G06F 3/0619 714/6.21 |
| 2015/0261693 A1 * | 9/2015 | Craddock | G06F 12/1475 711/113 |

OTHER PUBLICATIONS

U.S. Appl. No. 15/190,250, filed Jun. 23, 2016, Entitled: Synchronous Input / Output Hardware Acknowledgement of Write Completions, First Named Inventor: Scott A. Brewer.

* cited by examiner

SYNCHRONOUS INPUT/OUTPUT (I/O) CACHE LINE PADDING

BACKGROUND

The present disclosure relates to Synchronous input/output (I/O) on a computer, and more specifically, to Synchronous input/output cache line padding.

Storage Area Networks (SANs), as described by the Storage Networking Industry Association (SNIA), are high performance networks that enable storage devices and computer systems to communicate with each other. In large enterprises, multiple computer systems or servers have access to multiple storage control units within the SAN. Typical connections between the servers and control units use technologies such as Ethernet or Fibre-Channel, with the associated switches, I/O adapters, device drivers and multiple layers of a protocol stack. Fibre-channel, for example, as defined by the International Committee for Information Technology Standards (INCITS) T11 Committee, defines physical and link layers FC0, FC1, FC2 and FC-4 transport layers such as the Fibre Channel Protocol (FCP) for small computer system interface (SCSI) and FC-SB-3 for Fibre Connectivity (FICON).

Synchronous I/O causes a software thread to be blocked while waiting for the I/O to complete, but avoids context switches and interrupts. This works well when the I/O is locally attached with minimal access latency, but as access times increase, the non-productive processor overhead of waiting for the I/O to complete becomes unacceptable for large multi-processing servers. This disclosure describes an interface with sufficiently low latency that synchronous access is viable even for large multi-processing servers. Some network topologies may implement Synchronous I/O using a PCI Express (PCIe) link as defined by the Peripheral Component Interconnect (PCI)-Special Interest Group (SIG). In PCIe architecture, all memory write operations are considered 'Posted' type commands. Posted type commands in PCIe do not expect a response or acknowledgment for the write transaction. For data integrity in storage systems, it is important that data is never lost and the system maintains its integrity. To ensure data integrity of write operations in Synchronous I/O, the system requires an acknowledgment that the write data has been successfully written in the storage control unit.

Different processor architectures support different cache line sizes (e.g., 64, 128 bytes, etc.). When writing data that is less than the cache line size, the full cache line must be fetched and then the modified data must be merged with the original data into a unified cache line. In other words writing a partial cache line forces a read-modify-write operation. Synchronous I/O systems may perform status transfers for write acknowledgments that are less than a typical cache line size (e.g., 8 bytes) in comparison to the available cache data size (e.g., 64, 128 bytes, etc.). These partial write operations can cause processing inefficiency and latency.

SUMMARY

According to an embodiment of the present invention, a computer-implemented method for synchronous input/output (I/O) cache line padding is described. The cache line padding occurs between a server having a processor executing an operating system and a recipient control unit. The method can include receiving, via the processor at the recipient control unit, a partial line direct memory access (DMA) write request; fetching, via the processor, a device table entry (DTE) associated with the partial line DMA write request; determining, via the processor, a cache line size for a synchronous I/O cache line; and writing a full cache line DMA write request by padding, via the processor, the partial line DMA write request with a padded portion, where the padded portion is based on the cache line size.

According to other embodiments, a system for synchronous input/output (I/O) cache line padding is described. The system includes a recipient control unit operatively connected to a server. The recipient control unit may be configured to receive, via a processor at the recipient control unit, a partial line direct memory access (DMA) write request from the server; fetch, via the processor, a device table entry (DTE) associated with the partial line DMA write request; determine, via the processor, a cache line size for a synchronous I/O cache line; and write a full cache line DMA write request by padding, via the processor, the partial line DMA write request with a padded portion, wherein the padded portion is based on the cache line size.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
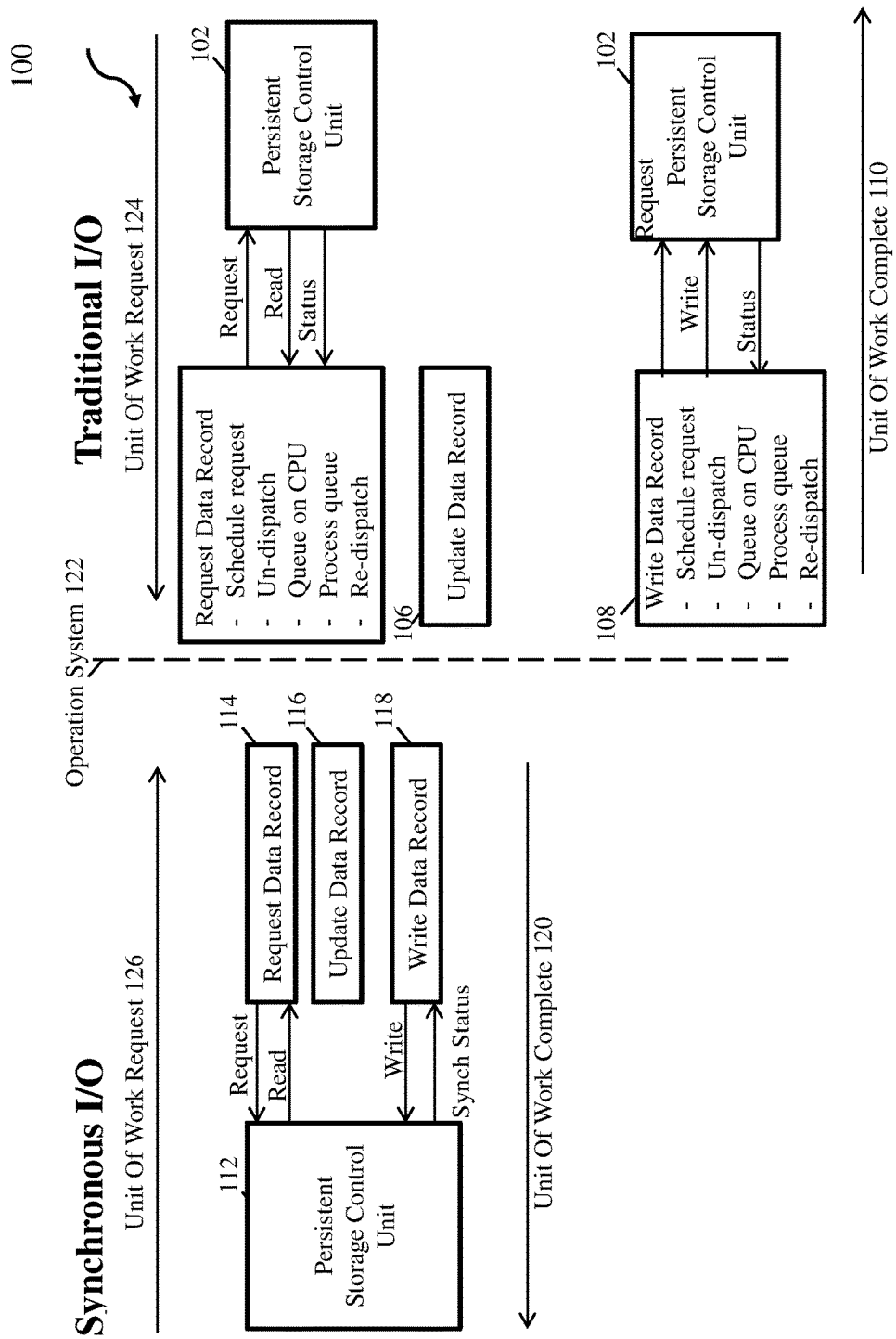
FIG. 1 illustrates a communication schematic comparing synchronous input/output (I/O) and traditional I/O in accordance with an embodiment.

In view of the above, embodiments of the present invention disclosed herein may include a synchronous system, method, and/or computer program product (herein synchronous system) that executes a protocol for exchanging control and authorization information between a server and a storage control unit before any Synchronous I/O operations can be performed for a Synchronous I/O link. For example, the protocol includes a sequence of exchanges for the server to provide a base status address to be used by the storage control unit for passing completion status information. Further, the protocol includes a sequence of exchanges for the storage control unit to provide one or more mailbox addresses that the server can use to initiate Synchronous I/O operations. In addition, link and control unit information is exchanged for authentication prior to initiating the Synchronous I/O operations.

Embodiments described herein include a Synchronous input/output (I/O) central processing unit (CPU) instruction or command that allows both the synchronous execution of read and write I/O operations, or the initiation of an I/O operation and subsequent synchronous test for completion. In embodiments, a synchronous low latency protocol running over an interface link such as Peripheral Component Interconnect Express (PCIe) is utilized to communicate directly between a processor (also referred to herein as a server) and a storage subsystem. The storage subsystem receives mailbox commands, delivered from the CPU over the PCIe link, that request the synchronous execution of read/write commands. For a read command, if the data is not already in the control unit cache the Synchronous I/O CPU instruction completes unsuccessfully. The control unit can initiate processing to asynchronously read the data into the control unit cache so that it can quickly be read via traditional I/O processing. If the data was in the cache, it can be transferred to the host memory and the Synchronous I/O CPU instruction completes successfully. Write operations can transfer data from host memory to the control unit cache of one or more nodes within the control unit. Successful write operations may include completion of synchronous input/output (I/O) commands between a processor executing an operating system and a host memory. Embodiments of Synchronous I/O described herein when compared to traditional I/O can be utilized to ensure Synchronous I/O write completion.

Described herein is a dynamic I/O paradigm for storage that can perform both synchronous and asynchronous (or traditional) processing from the application/middleware point of view. When applied to middleware, such as DB2® from International Business Machines (IBM®), this new paradigm can result in faster performance and maintain data persistence in the system. Current versions of DB2 can only have one I/O operation writing to the log at any one time. This single threaded process is highly dependent on the latency of these log write commands for the total throughput that can be accommodated for processing transactions. Embodiments of the Synchronous I/O paradigm described herein can reduce the amount of time that it takes to write to the log. Note, that multi-write technology (e.g., zHyperWrite® technology produced by IBM) provides a way of eliminating the latency required by synchronous replication of data. The combination of embodiments described herein with the use of multi-write technology can provide the ability to maintain continuous availability with multi-switch technology (e.g., HyperSwap technology produced by IBM) while getting the benefits of Synchronous I/O.

The workloads that run on the z/OS® operating system (an OS from IBM) can typically see very high storage controller data cache hit ratios (e.g., 90 percent) for read operations. This means that a high percent of the time the data is found in a dynamic random access memory (DRAM) cache in the storage subsystem (e.g., a persistent storage control unit), resulting in reduced I/O service times. These high cache hit ratios can be the result of a long tradition of close integration of the I/O stack from the applications ability to pass cache hints on I/O operations through optimized caching algorithms in the storage subsystem. When the data required for a read request is in DRAM in the storage subsystem it is amenable to being transferred to the host with the new Synchronous I/O paradigm. If a cache miss occurs, the storage subsystem can initiate the process to bring the data into cache but synchronously notify the host to execute the I/O operation using the traditional asynchronous model.

Utilizing embodiments described herein to avoid the un-dispatching and re-dispatching of critical applications and middleware, can lead to a reduction in OS overhead and eliminate the L1 and L2 cache damage that can occur when a context switch occurs for a different application. Reducing the L1 and L2 cache damage and re-dispatching of work can lead to a significant reduction in CPU cost. When embodiments are applied to DB2 executing on a z/OS platform, utilizing embodiments to accelerate read I/O and data base logging can reduce DB2 transactional latency and accelerate transaction processing on the z/OS platform by reducing or eliminating partial writes to memory.

FIGS. 1-5 describe several operations in connection with Synchronous I/O on a peripheral storage or other connected device (e.g., a recipient device). Turning now to FIG. 1, communication schematics 900 of a traditional I/O and a Synchronous I/O when updating data stored on a peripheral storage device are generally shown in accordance with embodiments. As shown on the right side of FIG. 1, performing traditional I/O operations includes receiving a unit of work request 124 at an operating system (OS) 122 in a logical partition (LPAR). The unit of work can be submitted, for example, from an application or middleware that is requesting an I/O operation. As used herein the term "unit of work" refers to dispatchable tasks or threads.

In response to receiving the unit of work request, OS 122 may perform the processing shown in block 104 to request a data record. This processing may include scheduling an I/O request by placing the I/O request on a queue for a persistent storage control unit (CU) 102 that contains a requested data record 104, and then un-dispatching the unit of work. Alternatively, the application (or middleware) can receive control back after the I/O request is scheduled to possibly perform other processing, but eventually the application (or middleware) relinquishes control of the processor to allow other units of work to be dispatched and the application (or middleware) waits for the I/O to complete and to be notified when the data transfer has completed with or without errors.

When persistent storage control unit (SCU) 102 that contains the data record 104 is available for use and conditions permit, the I/O request is started by the OS issuing a start sub-channel instruction or other instruction appropriate for the I/O architecture. The channel subsystem validates the I/O request, places the request on a queue, selects a channel (link) to persistent SCU 102, and when conditions permit begins execution. The I/O request is sent to persistent SCU 102, and persistent SCU 102 reads the requested data record from a storage device(s) of persistent SCU 102. The read data record along with a completion status message is sent from the persistent SCU 102 to the OS 122. Once the completion status message (e.g., via an I/O interrupt message) is received by OS 122, OS 122 requests that the unit of work be re-dispatched by adding the unit of work to the dispatch queue. This includes re-dispatching the LPAR to process the interrupt and retrieving, by the I/O supervisor in the OS, the status and scheduling the application (or middleware) to resume processing. When the unit of work reaches the top of the dispatch queue, the unit of work is re-dispatched.

Still referring to the traditional I/O as depicted in FIG. 1, once the data record is received by the OS 122, the OS 122 performs the processing in block 106 to update the data record that was received from the persistent SCU 102. At block 108, the updated data record is written to the persistent SCU 102. As shown in FIG. 1, this includes OS 122 scheduling an I/O request and then un-dispatching the instruction. The I/O request is sent to persistent SCU 102, and persistent SCU 102 writes the data record to a storage device(s) of persistent SCU 102. A completion status message (e.g., an interruption message) is sent from persistent SCU 102 to OS 122. Once the completion status message is received by OS 122, OS 122 requests that the unit of work be re-dispatched by adding the unit of work to the dispatch queue. When the unit of work reaches the top of the dispatch queue, the unit of work is re-dispatched. At this point, the unit of work is complete. As shown in FIG. 1, OS 122 can perform other tasks, or multi-task, while waiting for the I/O request to be serviced by persistent SCU 102.

The traditional I/O process is contrasted with a Synchronous I/O process. As shown in FIG. 1, performing a Synchronous I/O includes receiving a unit of work request at OS 122. In response to receiving the unit of work request, OS 122 performs the processing shown in block 114 which includes synchronously requesting a data record from persistent SCU 112 and waiting until the requested data record is received from persistent SCU 112. Once the data record is received by the OS 122, the OS 122 performs the processing in block 116 to update the data record. At block 118, the updated data record is synchronously written to the persistent SCU 112. A synchronous status message is sent from persistent SCU 112 to OS 122 to indicate the data has been successfully written. At this point, the unit of work is complete. As shown in FIG. 1, the OS 122 is waiting for the I/O request to be serviced by the persistent SCU 112 and is not performing other tasks, or multi-tasking, while waiting for the I/O request to be serviced. Thus, in an embodiment, the unit of work remains active (i.e., it is not un-dispatched and re-dispatched) until the OS is notified that the I/O request is completed (e.g., data has been read from persistent SCU, data has been written to persistent SCU, error condition has been detected, etc.).

Thus, as shown in FIG. 1, Synchronous I/O provides an interface between a server and a persistent SCU that has sufficiently low overhead to allow an OS to synchronously read or write one or more data records. In addition to the low overhead protocol of the link, an OS executing on the server can avoid the scheduling and interruption overhead by using a synchronous command to read or write one or more data records. Thus, embodiments of Synchronous I/O as described herein when compared to traditional I/O not only reduce the wait time for receiving data from a persistent SCU, they also eliminate steps taken by a server to service the I/O request. Steps that are eliminated can include the un-dispatching and re-dispatching of a unit of work both when a request to read data is sent to the persistent SCU and when a request to write data is sent to the persistent SCU. This also provides benefits in avoiding pollution of the processor cache that would be caused by un-dispatching and re-dispatching of work.

As used herein, the term "persistent storage control unit" or "persistent SCU" refers to a storage area network (SAN) attached storage subsystem with a media that will store data that can be accessed after a power failure. As known in the art, persistent SCUs are utilized to provide secure data storage even in the event of a system failure. Persistent SCUs can also provide backup and replication to avoid data loss. A single persistent SCU is typically attached to a SAN and accessible by multiple processors.

As used herein, the term "Synchronous I/O" refers to a CPU synchronous command that is used to read or write one or more data records, such that when the command completes successfully, the one or more data records are guaranteed to have been transferred to or from the persistent storage control unit into host processor memory. In some aspects, a hardware direct memory access (DMA) engine operating on the server, and/or a switch, and/or the receiving SCU, may confirm write operations on the SCU.

Figure 2:
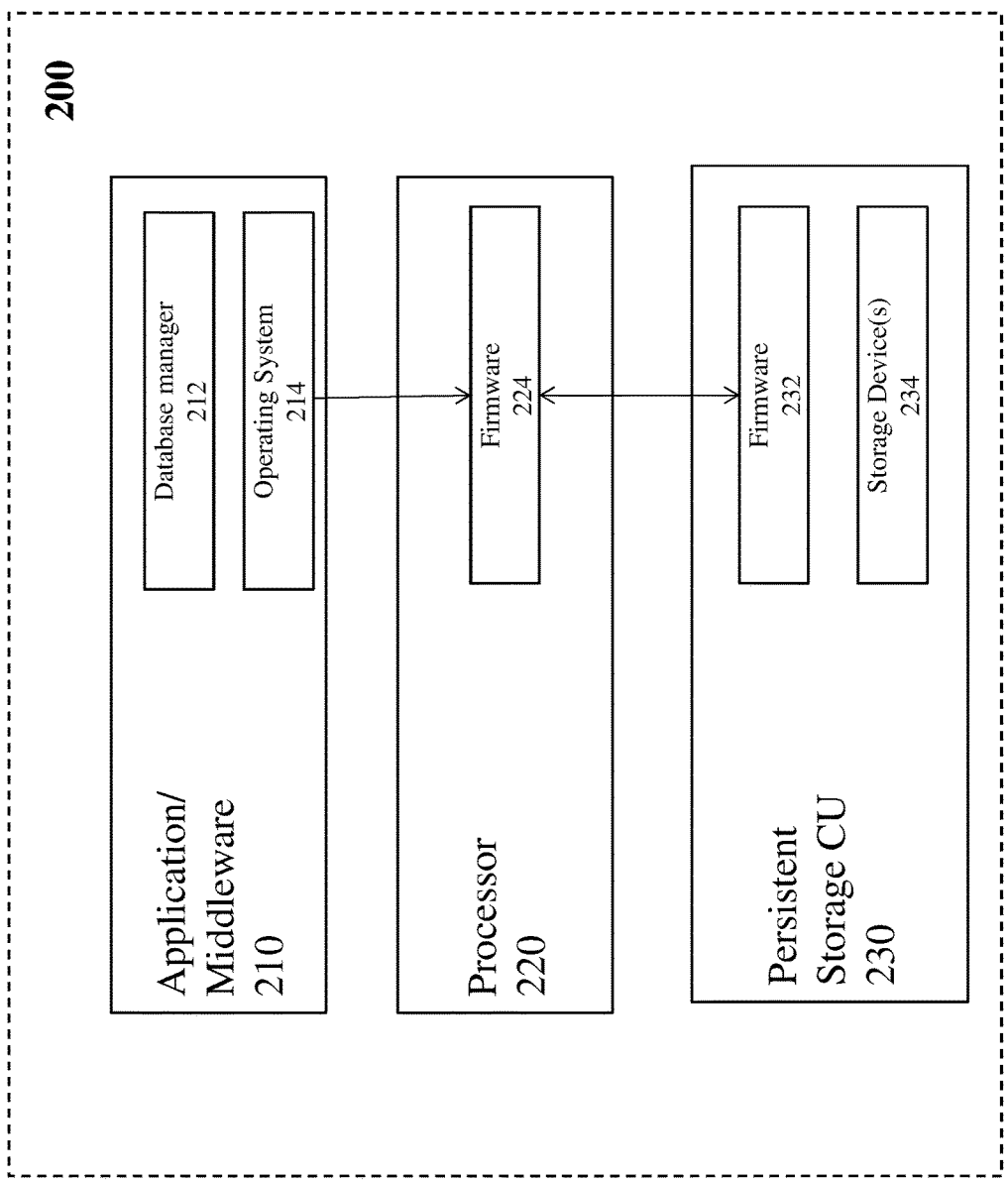
FIG. 2 illustrates a block diagram of a system for performing Synchronous I/O in accordance with an embodiment.

Turning now to FIG. 2, a block diagram of a system 200 (e.g., synchronous system) for performing Synchronous I/O is generally shown in accordance with an embodiment. The system 200 shown in FIG. 2 includes one or more application/middleware 210, one or more physical processors 220, and one or more persistent SCUs 230. The application/middleware 210 can include any application software that requires access to data located on the persistent SCU 230 such as, but not limited to a relational database manager 212 (e.g. DB2), an OS 214, a filesystem (e.g., z/OS Distributed File Service System z File System produced by IBM), a hierarchical database manager (e.g. IMS® produced by IBM), or an access method used by applications (e.g. virtual storage access method, queued sequential access method, basic sequential access method). As shown in FIG. 2, the database manager 212 can communicate with an OS 214 to communicate a unit of work request that requires access to the persistent SCU 230. The OS 214 receives the unit of work request and communicates with firmware 224 located on the processor 220 to request a data record from the persistent SCU 230, to receive the data record from the persistent SCU 230, to update the received data record, to request the persistent SCU 230 to write the updated data record, and to receive a confirmation that the updated data recorded was successfully written to the persistent SCU 230. The firmware 224 accepts the synchronous requests from the OS 214 and processes them. Firmware 232 located on the persistent SCU 230 communicates with the firmware 224 located on the processor 220 to service the requests from the processor 220 in a synchronous manner.

As used herein, the term "firmware" refers to privileged code running on the processor that interfaces with the hardware used for the I/O communications; a hypervisor; and/or other OS software.

Embodiments described herein utilize Peripheral Component Interconnect Express (PCIe) as an example of a low latency I/O interface that may be implemented by embodiments. Other low latency I/O interfaces, such as, but not limited to Infiniband™ as defined by the InfiniBand Trade Association and zSystems coupling links can also be implemented by embodiments.

Figure 3:
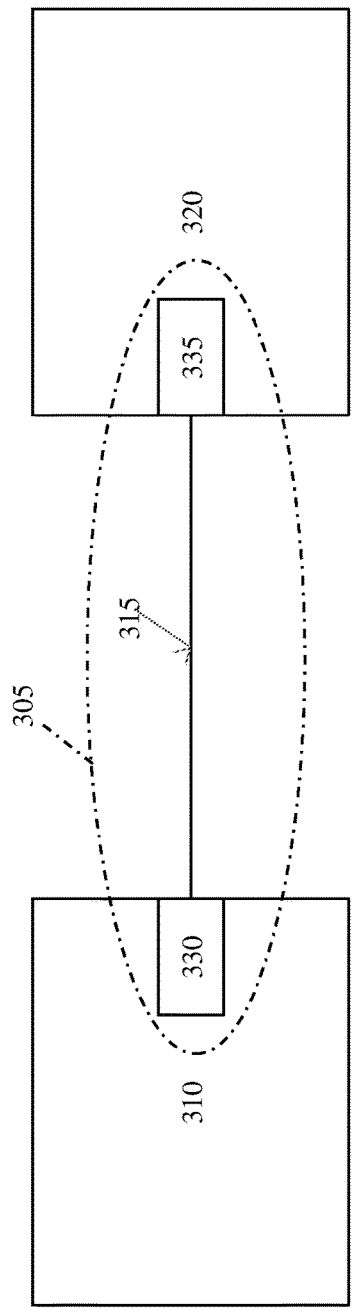
FIG. 3 illustrates a block diagram of an environment including a Synchronous I/O link interface in accordance with an embodiment.

Turning now to FIG. 3, a block diagram of an environment 300 including a Synchronous I/O link interface 305 is depicted in accordance with an embodiment. As shown in FIG. 3, environment 300 utilizes the Synchronous I/O link interface 305 as an interface between a server (e.g., a system 310) and a persistent SCU (e.g., a persistent SCU 320). According to some embodiments, persistent SCU 320 may be referred to as "recipient 320." The Synchronous I/O link interface 305 has sufficiently low latency and protocol overhead to allow an OS of system 310 to synchronously read or write one or more data records from persistent SCU 320. In addition to the low protocol overhead of the link, the OS can avoid the overhead associated with scheduling and interrupts by using a synchronous command via the Synchronous I/O link interface 305 to read or write one or more data records. The Synchronous I/O link interface 305, for example, can be provided as an optical interface based on any PCIe base specification (as defined by the PCI-SIG) using the transaction, data link, and physical layers. The Synchronous I/O link interface 305 may further include replay buffers and flow control credits to sustain full bandwidth.

System 310 is configured to provide at least one Synchronous I/O link interface 305 having at least one Synchronous I/O link 315 to allow connection to at least one persistent SCU (e.g., persistent SCU 320). It can be appreciated that two or more Synchronous I/O links 315 may be required for each connection to a persistent SCU. It can also be appreciated that two or more Synchronous I/O links 315 may support switch connections to a persistent SCU. In an exemplary embodiment, where PCIe is utilized, system 310 comprises a PCIe root complex 330 for the Synchronous I/O link 315, while persistent SCU 320 comprises a PCIe endpoint 335 for the control unit Synchronous I/O interface 305.

Figure 4:
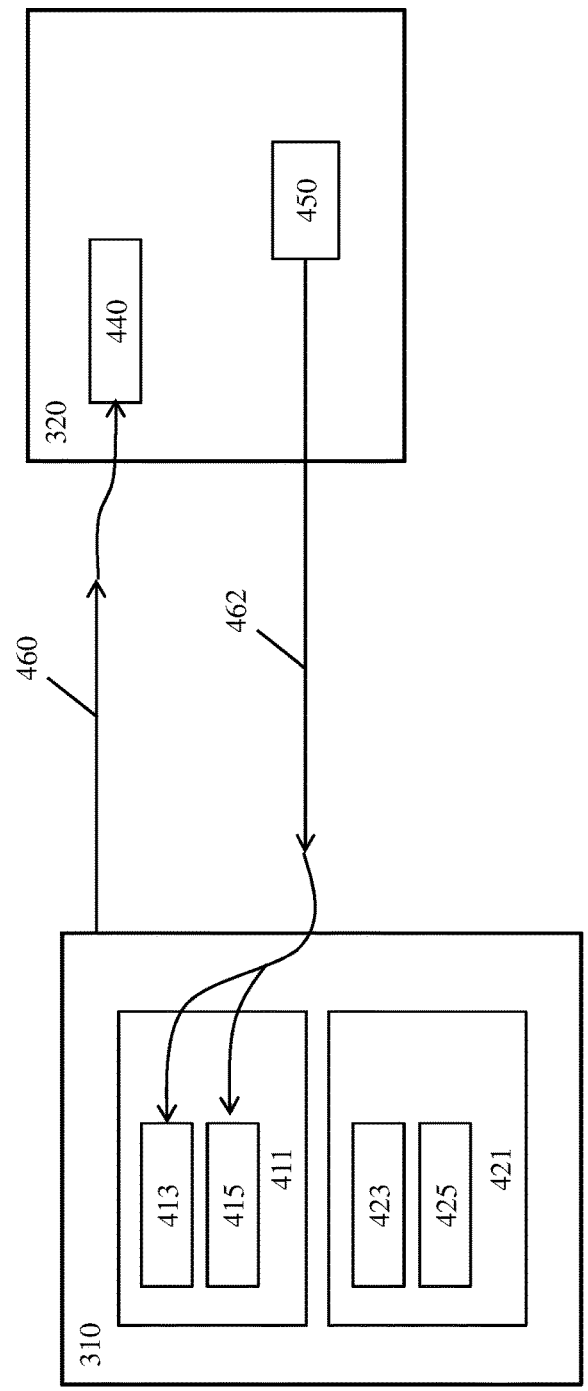
FIG. 4 illustrates a block diagram of an environment for performing Synchronous I/O with respect to a mailbox command and read operation in accordance with an embodiment.

Turning now to FIG. 4, a block diagram of an environment 400 for performing Synchronous I/O with respect to a mailbox command and read operation is depicted in accordance with an embodiment. As shown in FIG. 4, environment 400 includes a system 310 (e.g., includes the application/middleware 210 and processor 220 of FIG. 2) and a persistent SCU 320 (e.g., includes persistent SCU 230 of FIG. 2). System 310 includes a logical partition 411 comprising memory locations for a data record 413 and an associated suffix 415 and a status area 421 comprising a device table entry (DTE) 423 and a status field 425. DTE 423 is an example of a data structure used by the firmware to store the mappings, such as, between virtual addresses and physical addresses. Similarly, a function table entry (FTE) is an example of a data structure used by a function table to indicate access to a specified Synchronous I/O link. Persistent SCU 320 includes at least one mailbox 440 and a data record 450.

In operation, the OS of system 310 may issue Synchronous I/O commands to be processed by the firmware 224 to build a mailbox command 460. System 310 may forward the Synchronous I/O commands to persistent SCU 320. For example, upon processing a Synchronous I/O command for the OS by a firmware of system 310, the firmware prepares hardware of system 310 and sends the mailbox command 460 to persistent SCU 320. System 310 sends mailbox command 460 to persistent SCU 320 in one or more memory write operations (e.g., over PCIe, using a PCIe base mailbox address that has been determined during an initialization sequence described below). Persistent SCU 320 may support a plurality of mailboxes for each Synchronous I/O link 305. A mailbox location of the plurality of mailboxes can start at the base mailbox address, with each subsequent mailbox location sequentially located 256-bytes after each other. After the mailbox command 460 is sent, the firmware can poll status area 421 (e.g., a status field 425) for completion or error responses. In embodiments, status area 421 is located in privileged memory of system 310 and is not accessible by the OS executing on system 310. Status area 421 is accessible by the firmware on system 310 and the firmware can communicate selected contents (or information related to or based on contents) of status area 421 to the OS (e.g., via a command response block).

In general, system 310 may issue a single mailbox command 460 to each mailbox at a time. A subsequent mailbox command will not issue to a mailbox 440 until persistent SCU 320 has completed a previous mailbox command or system 310 has detected an error condition (such as a timeout, when the data is not in cache, error in the command request parameters, etc.). System 310 may identify successive mailbox commands for a given mailbox 440 by a monotonically increasing sequence number. Accordingly, system 310 can select mailboxes in any random order.

Persistent SCU 320 polls all mailboxes for each Synchronous I/O link 305 and can process the commands in one or more mailboxes in any order. In an embodiment, persistent SCU 320 polls four mailboxes for each Synchronous I/O link 305. Receipt of a new mailbox command with an incremented sequence number provides confirmation that the previous command has been completed (either successfully or in error by system 310). In an embodiment, Persistent SCU 320 may also use the sequence number to determine an offset of status area 421. The mailbox command can be of a format that includes 128-bytes. System 310 may extend the mailbox command by additional 64-bytes or more in order to transfer additional data records. In an embodiment, a bit in the mailbox command is set to indicate the absence or presence of the additional data records.

The mailbox command can further specify the type of data transfer operations, e.g., via an operation code. Data transfer operations include read data and write data operations. A read operation transfers one or more data records from persistent SCU 320 to a memory of system 310. A write operation transfers one or more data records from the memory of system 310 to the storage persistent SCU 320. In embodiments, data transfer operations can also include requesting that persistent SCU 320 return its Worldwide Node Name (WWNN) to the firmware in the server. In further embodiments, data transfer operations can also request that diagnostic information be gathered and stored in persistent SCU 320.

System 310 can protect the contents of the mailbox command in any of the data transfer operations using a cyclic redundancy check (CRC) (e.g., a 32 bit CRC). In an embodiment, system 310 may protect the mailbox command by a checksum. In an embodiment, if persistent SCU 320 detects a checksum error, a system 310 returns a response code.

Continuing with FIG. 4, a Synchronous I/O read data record operation will now be described. For instance, if a mailbox command 460 includes an operation code set to read, persistent SCU 320 determines if the data record or records 450 are readily available, such that the data transfer can be initiated in a sufficiently small time to allow the read to complete synchronously. If the data record or records 450 are not readily available (or if any errors are detected with this mailbox command 460), processor 220 may transfer a completion status back to system 310. If the read data records are readily available, persistent SCU 320 provides 462 data record 450.

In an embodiment, persistent SCU 320 processes the mailbox command 460, fetches the data record 450, provides CRC protection, and transfers/provides data record 450 over the Synchronous I/O link 305. Persistent SCU 320 can provide data record 450 as sequential memory writes over PCIe, using the PCIe addresses provided in the mailbox command 460. Each data record may require either one or two PCIe addresses for the transfer as specified in the mailbox command 460. For example, if length fields in the mailbox command indicate the data record is to be transferred in a single contiguous PCIe address range, only one starting PCIe address is required for each record, with each successive PCIe memory write using contiguous PCIe addresses. In embodiments, the length fields specify the length in bytes of each data record to be transferred.

Data record 450 can include a data portion and a suffix stored respectively on data record 413 and suffix 415 memory locations of the logical partition 411 after the data record 450 is provided. Data record 413 can be count key data (CKD) or extended count key data (ECKD). Data record 413 can also be utilized under small computer system interface (SCSI) standards, such as SCSI fixed block commands. Regarding the suffix, at the end of each data record 450, additional 4-bytes can be transferred comprising a 32-bit CRC that has been accumulated for all the data in the data record 450. An operating system file system may create the metadata of suffix 415, which may be used for managing a data efficiently. The operating system can transfer the last memory write transaction layer packet along with the last bytes of data record 450, or in an additional memory write.

In addition, a host bridge of system 310 performs address translation and protection checks (e.g., on the PCIe address used for the transfers) and provides an indication in the DTE 423 to the firmware of system 310 when data read 462 is complete. The host bridge can also validate that the received CRC matches the value accumulated on the data transferred. After system 310 records the last data record and initiates the corresponding CRC on Synchronous I/O link 305, persistent SCU 320 considers this mailbox command 460 complete and must be ready to accept a new command in this mailbox 440.

In an exemplary embodiment, system 310 will consider the mailbox command complete when all the data records 450 have been completely received and the corresponding CRC has been successfully validated. For example, the firmware performs a check of status area 421 to determine if the data read 462 was performed without error (e.g., determines if the DTE 423 indicates 'done' or 'error'). If system 310 performs data read 462 without error and is complete, the firmware then completes the Synchronous I/O command. System 310 will also consider the mailbox command complete if an error is detected during the data read 462 or CRC checking process, error status is received from persistent SCU 320, or the data read 462 does not complete within the timeout period for the read operation.

Embodiments of the mailbox command can also include a channel image identifier that corresponds to a logical path previously initialized by the establish-logical-path procedure, for example over a fibre-channel interface. If the logical path has not been previously established, a response code corresponding to this condition can be written to status area 421 to indicate that the logical path was not previously established.

The mailbox command block can also include a persistent SCU image identifier that corresponds to a logical path previously initialized by the establish-logical-path procedure. If the logical path has not been previously established, a response code corresponding to this condition can be written to status area 421 to indicate that the logical path was not previously established.

The mailbox command block can also include a device address within the logical control unit (e.g., a specific portion of the direct access storage device located in the storage control unit) that indicates the address of the device to which the mailbox command is directed. The device address should be configured to the persistent SCU specified, otherwise persistent SCU 320 can return a response code (e.g., to status area 421 in system 310) to indicate this condition.

The mailbox command block can also include a link token that is negotiated by the channel and persistent SCU 320 each time the Synchronous I/O link is initialized. If persistent SCU 320 does not recognize the link token, it can return a value to status area 421 that indicates this condition.

The mailbox command block can also include a WWNN that indicates the WWNN of the persistent SCU to which the command is addressed. In embodiments, it is defined to be the 64-bit IEEE registered name identifier as specified in the T11 Fibre-Channel Framing and Signaling 4 (FC-FS-4) document. If the specified WWNN does not match that of the receiving persistent SCU, then a response code indicating this condition is returned to processor.

The mailbox command block can also include device specific information that is used to specify parameters specific to this command. For example, for enterprise disk attachment when a write or read is specified by the operation code, device specific information can include the prefix channel command. In another example, when the operation code specifies that the command is a diagnostic command, the device specific information can include a timestamp representing the time at which this command was initiated and a reason code.

The mailbox command can also include a record count that specifies the number of records to be transferred by this Synchronous I/O command (or mailbox command).

The mailbox command can also include a mailbox valid bit(s) that indicates whether the mailbox command is valid and whether the entire mailbox command has been received.

Figure 5:
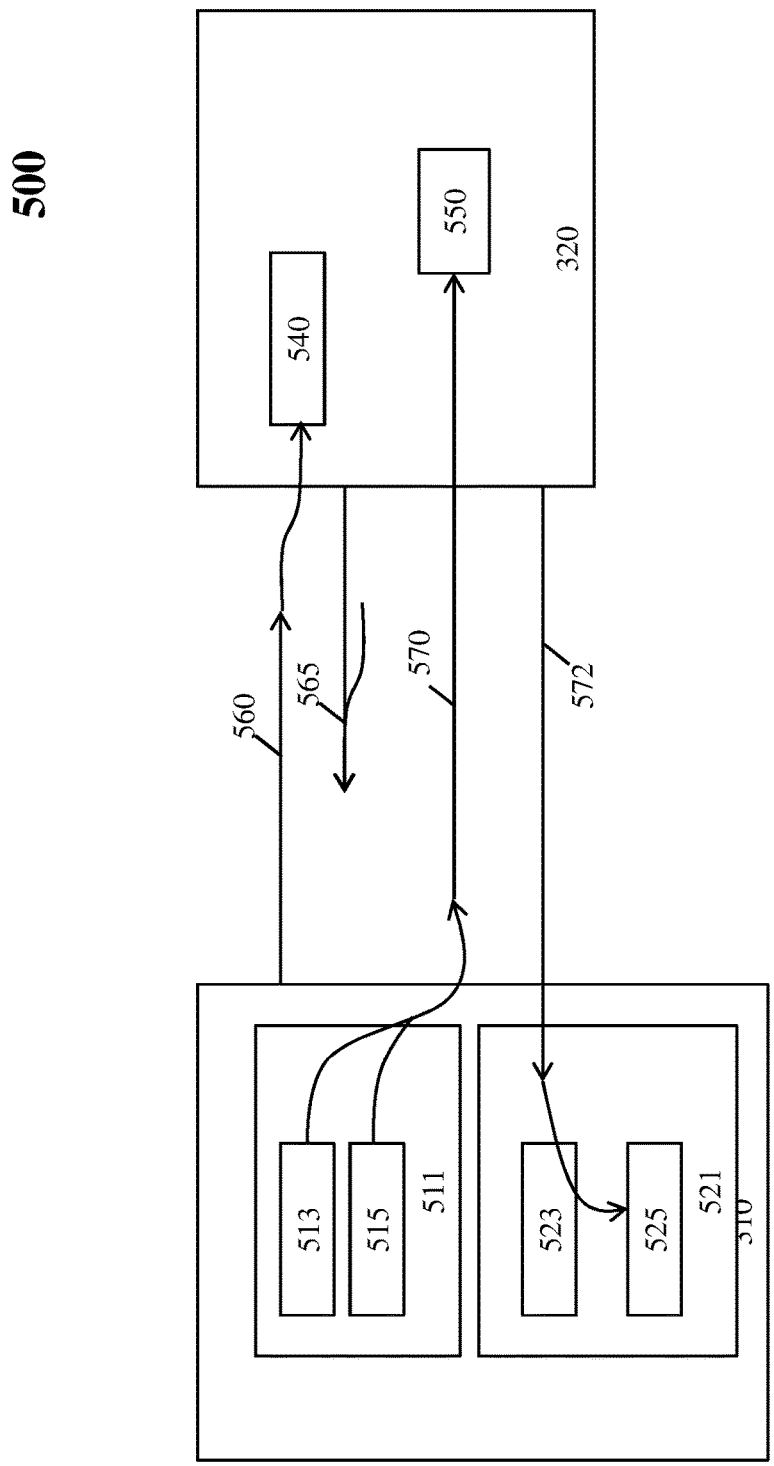
FIG. 5 illustrates a block diagram of an environment for performing Synchronous I/O with respect to a write operation in accordance with an embodiment.

In view of the above, a Synchronous I/O write data record operation will now be described with respect to FIG. 5 in accordance with an embodiment. As shown in FIG. 5, environment 500 includes a system 310 and a persistent SCU 320. System 310 includes a logical partition 511 comprising memory locations for a data record 513 and a suffix 515 and a status area 521 comprising a DTE 523 and a status field 525. Persistent SCU 320 includes at least one mailbox 540 and a data record 550 once written.

In operation, for example, upon processing a synchronization I/O command for the OS by a firmware of system 310, the firmware prepares hardware of system 310 and sends mailbox command 560 to mailbox 540 of persistent SCU 320. As noted above, a plurality of mailboxes can be supported by persistent SCU 320 for each Synchronous I/O link 305. Further, after mailbox command 560 is sent, the firmware can poll status area 521 (e.g., a status field 525) for completion or error responses.

If a mailbox command 560, issued to mailbox 540, includes an operation code set to write, persistent SCU 320 determines if it is able to accept the transfer of the data record or records 550. If persistent SCU 320 is not able to accept the transfer (or if any errors are detected with this mailbox command 560), a completion status is transferred back to system 310. If persistent SCU 320 is able to accept the transfer, persistent SCU 320 issues memory read requests 565 for the data.

In an embodiment, persistent SCU 320 processes the mailbox command 560 and issues a read request 565 over PCIe (using the PCIe addresses provided in the mailbox command 560) to fetch the data including the data record 513 and the suffix 515. In response to the read request 565, the host bridge of system 310 performs address translation and protection checks on the PCIe addresses used for the transfers.

Further, system 310 responds with memory read responses 570 to these requests. That is, read responses 570 are provided by system 310 over the Synchronous I/O link 305 to persistent SCU 320 such that the data record 550 can be written. Each data record may require either one or two PCIe addresses for the transfer as specified in the mailbox command 560. For example, if the length fields in the mailbox command indicate the entire record can be transferred using a single contiguous PCIe address range, only one starting PCIe address is required for each record, with each successive PCIe memory read request using contiguous PCIe addresses. At the end of each data record, the additional 8-bytes will be transferred consisting of the 32-bit CRC that has been accumulated for all the data in the record and optionally a longitudinal redundancy check (LRC) or other protection data that has also been accumulated. The total number of bytes requested for each record can be 8-bytes greater than the length of the record to include the CRC protection bytes and the additional 4-bytes for a LRC.

After the data and CRC/LRC protection bytes have been successfully received, persistent SCU 320 responds by issuing a memory write 572 (e.g., of 8-bytes of data). Persistent SCU 320 considers this mailbox command 560 complete after initiating this status transfer and must be ready to accept a new command in this mailbox 540. System 310 will consider the mailbox command 560 complete when the status transfer has been received. For example, the firmware performs a check of the status area 521 (e.g., determines if the DTE 523 indicates 'done' or 'error'). System 310 will also consider mailbox command 560 complete if an error is detected during the data transfer, error status is received from persistent SCU 320, or the status is not received within the timeout period for this operation.

Figure 6:
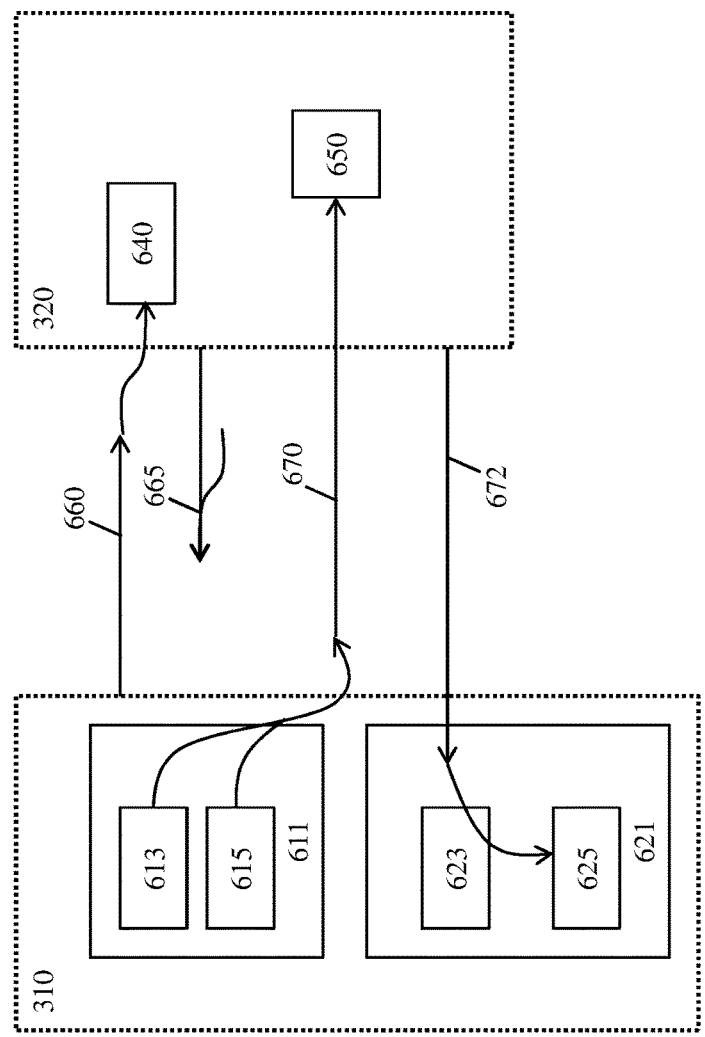
FIG. 6 illustrates a block diagram of an environment for performing Synchronous I/O with respect to a completion status operation in accordance with an embodiment.

In view of the above, a synchronous I/O write data record operation will now be described with respect to FIG. 6 in accordance with an embodiment. As shown in FIG. 6, the environment 600 includes a system 310 and a persistent SCU 320. The system 310 includes a logical partition 611 comprising memory locations for a data record 613 and a suffix 615 and a status area 621 comprising a DTE 623 and a status field 625. The persistent SCU 320 includes at least one mailbox 540 and a data record 550 once written.

In operation, for example, upon processing a synchronization I/O command for the OS by a firmware of the system 310, the firmware prepares hardware of the system 310 and sends the mailbox command 660 to mailbox 640 of the persistent SCU 320. As noted above, a plurality of mailboxes can be supported by the persistent SCU 320 for each synchronous I/O link 305. Further, after the mailbox command 660 is sent, the firmware can poll the status area 621 (e.g., a status field 625) for completion or error responses.

If a mailbox command 660, issued to mailbox 640, includes an operation code set to write, the persistent SCU 320 determines if it is able to accept the transfer of the data record or records 650. If the persistent SCU 320 is not able to accept the transfer (or if any errors are detected with this mailbox command 660), a completion status is transferred back to the system 310. If the persistent SCU 320 is able to accept the transfer, the persistent SCU 320 issues memory read requests 665 for the data.

In an embodiment, the persistent SCU 320 processes the mailbox command 660 and issues a read request 665 over PCIe (using the PCIe addresses provided in the mailbox command 660) to fetch the data including the data record 613 and the suffix 615. In response to the read request 665, the host bridge of the system 310 performs address translation and protection checks on the PCIe addresses used for the transfers.

Further, the system 310 responds with memory read responses 670 to these requests. That is, read responses 670 are provided by the system 310 over the synchronous I/O link 305 to the persistent SCU 320 such that the data record 650 can be written. Each data record may require either one or two PCIe addresses for the transfer as specified in the mailbox command 660. For example, if the length fields in the mailbox command indicate the entire record can be transferred using a single contiguous PCIe address range, only one starting PCIe address is required for each record, with each successive PCIe memory read request using contiguous PCIe addresses. At the end of each data record, the additional 8-bytes will be transferred consisting of the 32-bit CRC that has been accumulated for all the data in the record and optionally an LRC or other protection data that has also been accumulated. The total number of bytes requested for each record can be 8-bytes greater than the length of the record to include the CRC protection bytes and the additional 4-bytes for a longitudinal redundancy check (LRC).

After the data and CRC/LRC protection bytes have been successfully received, the persistent SCU 320 responds by issuing a memory write 672 (e.g., of 8-bytes of data). The persistent SCU 320 considers this mailbox command 660 complete after initiating this status transfer and must be ready to accept a new command in this mailbox 640. The system 310 will consider the mailbox command 660 complete when the status transfer has been received. For example, the firmware performs a check of the status area 621 (e.g., determines if the DTE 623 indicates 'done' or 'error'). The system 310 will also consider the mailbox command 660 complete if an error is detected during the data transfer, error status is received from the persistent SCU 320, or the status is not received within the timeout period for this operation.

Figure 7:
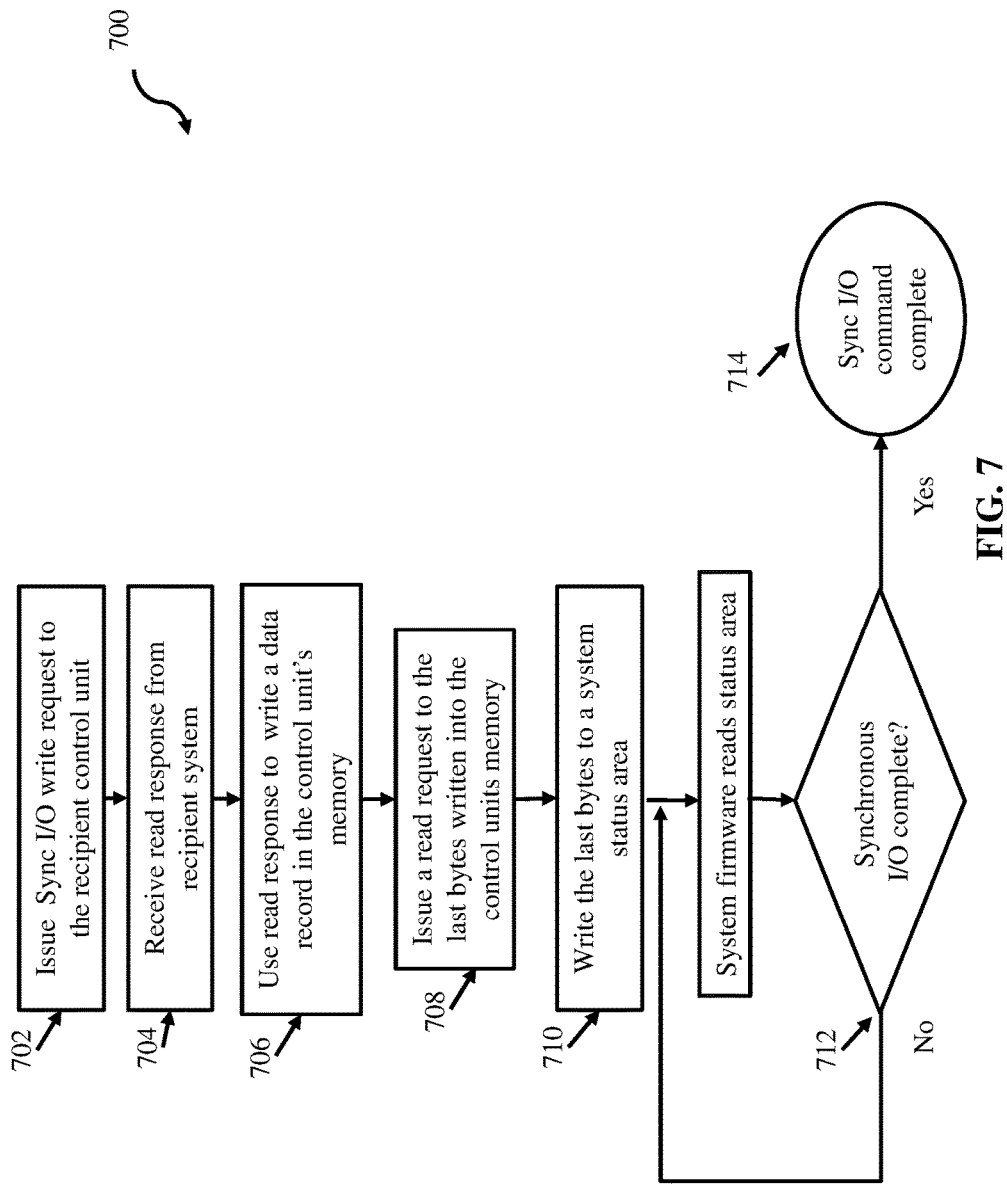
FIG. 7 depicts a computer-implemented method 700 for communicating completion of synchronous input/output (I/O) commands in accordance with an embodiment.

FIG. 7 depicts a computer-implemented method 700 for communicating completion of synchronous input/output (I/O) commands between a processor (e.g., system 310) executing an operating system and a recipient control unit (e.g., SCU 320), according to one embodiment. Referring now to FIG. 7, according to some embodiments, the processor on system 310 may issue a Sync I/O write request to the recipient control unit SCU 320, as shown in block 702. SCU 320 may receive the I/O command, and issue a DMA read request to system 310, to which the system 310 responds with read responses.

As shown in block 704, SCU 320 may receive the read response from system 310, and use that to write a data record to a memory of SCU 320, as shown in block 706.

At block 708, SCU 320 may issue a read request to read the last bytes written into SCU 320's memory. The DMA read request may include a CRC portion, an LRC portion, which comprises an echo read portion. The echo read portion confirms that the record (which includes the echo read portion at the end of the record to be recorded on recipient 320) was successfully received by recipient 320 and recorded to memory. According to some embodiments, the echo read portion may include 8 bytes at the end of the record. Accordingly, as shown at block 710, the processor may receive a DMA write confirmation comprising the echo read portion of the record, that was written by SCU 320 and is written to a system status area.

According to embodiments described herein, PCI ordering rules dictate that a DMA read request will not pass a prior DMA write request. Accordingly, the DMA read request of the echo read confirms that the data record has been successfully written. This PCI ordering rule guarantees that the data record write has completed once the system receives the completion reply for the echo read.

As shown in decision block 712, system 310 may determine whether the Synchronous I/O is complete. Responsive to determining that the echo read portion of the record received by the processor matches the echo read portion issued to the recipient control unit (SCU 320), according to some embodiments, system 310 may update status field 625 with information indicative that the record was successfully written to SCU 320. System 310 may repeat determination of whether the Synchronous I/O is complete until the record is successfully written.

As shown in block 714, Sync I/O command completes if system 310 determines that the Synchronous I/O has completed.

Figure 8:
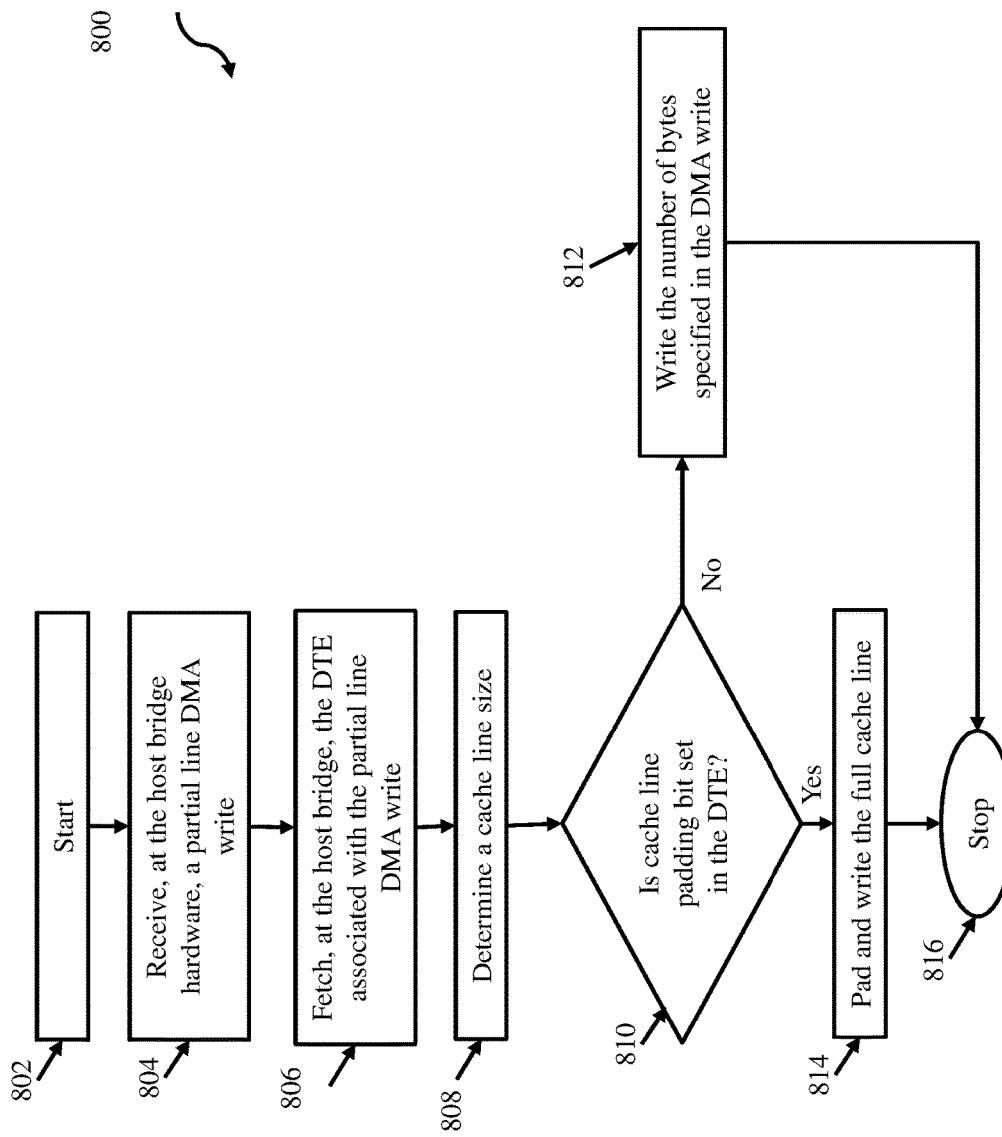
FIG. 8 depicts a computer-implemented method 700 for communicating completion of synchronous input/output (I/O) commands in accordance with an embodiment.

Current processors are based on caching with a certain size. For example, cache lines in current processors may be 64 bytes, 128 bytes, 256 bytes, etc. When a host node having a smaller cache line size (128 bytes, for example) performs Synchronous I/O operations with a server having a different size cache node (e.g., 256 bytes), the systems are forced to perform a partial read and/or a partial write to unify the cache data lines. For example, if a cache data line is 256 bytes, then a message having 8 bytes would be a partial cache line, and thus, must be fetched by the processor. In partial cache line write scenarios, modified data must be merged together into a unified cache line then written back into memory. Current systems are configured this way to conserve memory. This partial read and/or partial write situation forces a read-modify-write cycle by the processor, which causes processing inefficiency. It may be advantageous to pad the Synchronous I/O cache line to form a unified cache line during I/O synchronous operations and to consume the entire cache line for one operation. For example the 8-byte echo read described above could be padded to form a complete cache line before writing to the status area. FIG. 8 depicts a computer-implemented method 800 for synchronous input/output (I/O) cache line padding, according to one embodiment.

Referring now to FIG. 8, as shown in block 802, after an initial start step 802, a host bridge of system 310 may receive a partial line DMA write request at block 804. The host bridge may fetch the DTE associated with the partial line DMA write, as shown in block 806.

As shown in block 808, hardware the host bridge may fetch the DTE associated with the partial line DMA write, as shown in block 806.

As shown in block 808, the host bridge may determine a cache line size. For example, the cache line size of the server may be configured for 256 bytes of information. In some aspects, when a partial line DMA write request is received, the host bridge may be configured to lookup the DTE used in the address translation. Some embodiments allocate a predetermined code bit in the DTE that tells whether padding is enabled. In some embodiments, a predetermined number of memory blocks may be allocated and associated with one or more DTEs for padding operations.

After determining whether the cache line padding bit is set in the DTE, as shown in block 810, the host bridge will either write the number of bytes specified in the DMA write, as shown in block 812, or pad to the full cache line size if the cache line is less than full, as shown in block 814. The partial DMA write request must be cache line aligned.

The full cache line DMA write request becomes "full" when written with the padded portion. According to some embodiments, the padded portion may include all zeroes after the echo read portion (which may be, e.g., 8 bytes of information). For example, if the echo read portion is 8 bytes and the cache line for system 310 is 256 bytes, then the padded portion may be 248 bytes of zeroes. The padded portion may be other sizes according to the size of the echo read portion and the size of the particular cache line. In some embodiments, the padded zeros portion of the cache line will clear non-zero bits in memory. These can be status bits and the transition from '1' to '0' can indicate the value has been updated.

Figure 9:
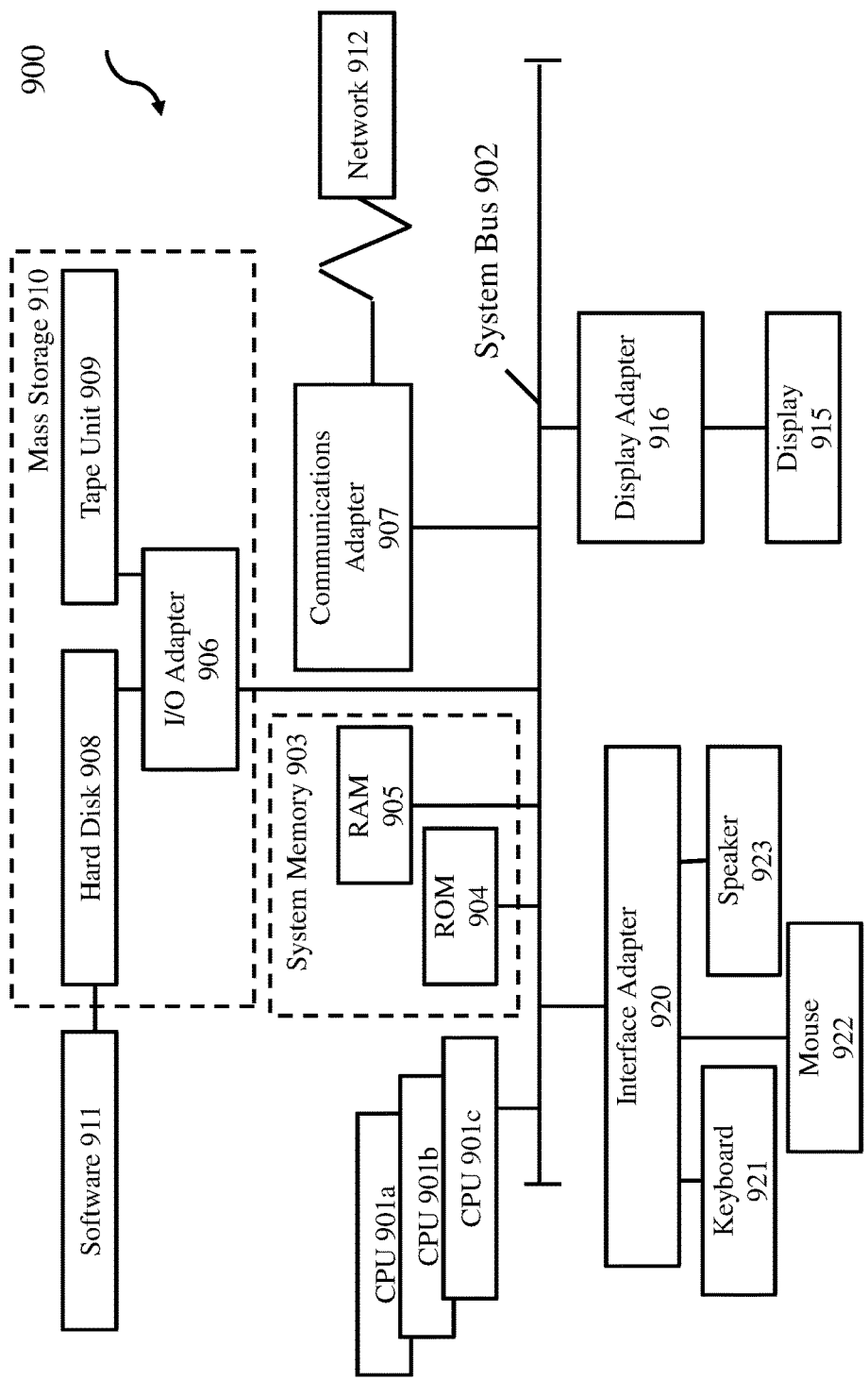
FIG. 9 illustrates a block diagram of a computer system 900 for use in practicing the embodiments described herein

FIG. 9 illustrates a block diagram of a computer system 900 (hereafter "computer 900") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 900 therefore can embody a general-purpose computer. In another exemplary embodiment, the methods described herein are implemented as part of a mobile device, such as, for example, a mobile phone, a personal data assistant (PDA), a tablet computer, etc.

FIG. 9 further depicts an input/output (I/O) adapter 906 and a network adapter 907 coupled to the system bus 902. I/O adapter 906 may be a small computer system interface (SCSI) adapter that communicates with a hard disk 908 and/or tape storage drive 909 or any other similar component. I/O adapter 906, hard disk 908, and tape storage drive 909 are collectively referred to herein as mass storage 910. Software 911 for execution on processing system 900 may be stored in mass storage 910. The mass storage 910 is an example of a tangible storage medium readable by the processors 901, where the software 911 is stored as instructions for execution by the processors 901 to perform a method, such as the process flows above. Network adapter 907 interconnects system bus 902 with an outside network 912 enabling processing system 900 to communicate with other such systems. A screen (e.g., a display monitor) 915 is connected to system bus 902 by display adapter 916, which may include a graphics controller to improve the performance of graphics intensive applications and a video controller. In one embodiment, adapters 906, 907, and 916 may be connected to one or more I/O buses that are connected to system bus 902 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 902 via an interface adapter 920 and the display adapter 916. A keyboard 921, mouse 922, and speaker 923 can be interconnected to system bus 902 via interface adapter 920, which may include, for example, a Super I/O chip integrating multiple device adapters into a single integrated circuit.

Thus, as configured in FIG. 9, processing system 905 includes processing capability in the form of processors 901, and, storage capability including system memory 903 and mass storage 910, input means such as keyboard 921 and mouse 922, and output capability including speaker 923 and display 915. In one embodiment, a portion of system memory 903 and mass storage 910 collectively store an OS, such as the z/OS or AIX OS from IBM Corporation, to coordinate the functions of the various components shown in FIG. 9.

Technical effects and benefits of the embodiments herein provide advantages over asynchronous/traditional I/O commands by avoiding overhead of interrupt processing and dispatching.

For instance, asynchronous/traditional I/O commands include the disadvantage that while waiting on an I/O operation to complete, a processor executes other productive work, causing overhead for un-dispatch and re-dispatch, context switch overhead with the I/O interrupt and the processor cache content change. In contrast, embodiments herein allows multiple Synchronous I/O commands to be initiated, thus allowing multiple Synchronous I/O operations to begin, while also allowing additional work to be performed before resuming the command to determine when the I/O operation completes. Further, Synchronous I/O commands allow an operating system to issue multiple synchronous I/O commands to multiple targets or transfer multiple records to the same or different targets, to achieve parallelism, and thus improved performance over multiple operations.

In another example, traditional enterprise storage attachments, such as Fiber Connection (FICON) and Fibre Channel Protocol (FCP), have multiple protocol layers that require several hardware, firmware and software levels of processing which cause overhead and add latency. In contrast, the Synchronous I/O of embodiments herein eliminates many of these layers, thus improving system efficiency while providing the enterprise qualities of service that includes end-to-end data integrity checking, in-band instrumentation and measurements, work load management and continuous availability with predictable and repeatable high performance.

Embodiments described herein provide SAN attached external persistent storage for synchronous access. In addition, embodiments provide the dynamic switching between Synchronous I/O and a Synchronous I/O access. Shareable external SAN storage typically will have a mix of short and long running I/O operations which can utilized and benefit from this ability to dynamically switch between the synchronous and asynchronous selection. Embodiments also provide a means for notifying software when the data is not available for synchronous access and the dynamic switching to asynchronous access.

Embodiments described herein provide a low-latency protocol for server to SAN storage communication that allows Synchronous I/O access with its inherent advantages of avoiding context switches, interruptions and processor cache pollution, while also providing mechanisms for avoiding processor blocking when access times become too great. Mechanisms are described for dynamic notification and selection of synchronous or asynchronous I/O access.

Thus, embodiments described herein are necessarily rooted in processing system to perform proactive operations for efficiently replicating data across multiple storage subsystems in order to provide continuous availability to overcome problems specifically arising in the realm of traditional I/O and storage subsystem failures.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments herein.

Aspects of the embodiments herein are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the embodiments herein. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments of the embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for synchronous input/output (I/O) cache line padding between a server having a processor executing an operating system and a recipient control unit, the method comprising:
   receiving, via the processor, at the recipient control unit, a partial cache line direct memory access (DMA) write request;
   fetching, via the processor, a device table entry (DTE) associated with the partial cache line DMA write request;
   determining, via the processor, a cache line size for a synchronous I/O cache line;
   determining, via the processor, whether a cache line padding bit in the DTE is set;
   based on determining that the cache line padding bit in the DTE is set, writing a full cache line DMA write request by padding, via the processor, the partial cache line DMA write request with a padded portion, wherein the padded portion is based on an echo read portion and the cache line size; and
   based on determining that the cache line padding bit in the DTE is not set, writing the partial cache line DMA write request.

2. The computer-implemented method of claim 1, wherein the full cache line DMA write request comprises the partial cache line DMA write request and the padded portion.

3. The computer-implemented method of claim 1, wherein the full cache line DMA write request is the same size as an address length boundary size.

4. The computer-implemented method of claim 1, wherein the cache line size of the server is configured for 256 bytes of information.

5. The computer-implemented method of claim 1, wherein the full cache DMA write request comprises an 8 byte portion and the padded portion, wherein the padded portion is 248 bytes of information.

6. The computer-implemented method of claim 1, wherein the padded portion consists of zeroes.

7. The computer-implemented method of claim 1, wherein the server and the recipient control unit have different cache line sizes.

8. The computer-implemented method of claim 1, wherein the echo read portion is a confirmation that a record is successfully written.

9. The computer-implemented method of claim 1, wherein the echo read portion is 8 bytes.

10. The computer-implemented method of claim 1, wherein the echo read portion is used to form a complete cache line prior to writing to a status area.

11. A system for synchronous input/output (I/O) cache line padding comprising a recipient control unit operatively connected to a server, the server comprising a processor and memory, and configured to:
   receive, via the processor, at the recipient control unit, a partial cache line direct memory access (DMA) write request from the server;
   fetch, via the processor, a device table entry (DTE) associated with the partial cache line DMA write request;
   determine, via the processor, a cache line size for a synchronous I/O cache line;
   determine, via the processor, whether a cache line padding bit in the DTE is set;
   based on determining that the cache line padding bit in the DTE is set, writing a full cache line DMA write request by padding, via the processor, the partial cache line DMA write request with a padded portion, wherein the padded portion is based on an echo read portion and the cache line size; and based on determining that the cache line padding bit in the DTE is not set, writing the partial cache line DMA write request.

12. The system of claim 11, wherein the full cache line DMA write request comprises the partial cache line DMA write request and the padded portion.

13. The system of claim 11, wherein the full cache line DMA write request is the same size as an address length boundary size.

14. The system of claim 11, wherein the cache line size of the server is configured for 256 bytes of information.

15. The system of claim 11, wherein the DMA write request comprises an 8 byte portion and the padded portion, wherein the padded portion is 248 bytes of information.

16. The system of claim 11, wherein the padded portion consists of zeroes.

17. The system of claim 11, wherein the server and the recipient control unit have different cache line sizes.

18. The system of claim 11, wherein the echo read portion is a confirmation that a record is successfully written.

19. The system of claim 11, wherein the echo read portion is 8 bytes.

20. The system of claim 11, wherein the echo read portion is used to form a complete cache line prior to writing to a status area.

* * * * *